United States Patent [19]

Tomita

[11] Patent Number: 4,851,116
[45] Date of Patent: Jul. 25, 1989

[54] MAGNET FILTER

[76] Inventor: Kazuyuki Tomita, 12-7, Yamate-cho 2-chome, Suita-shi, Osaka-fu, Japan

[21] Appl. No.: 1,729

[22] Filed: Jan. 7, 1987

[30] Foreign Application Priority Data

Aug. 29, 1986 [JP] Japan ............................ 61-131290[U]

[51] Int. Cl.⁴ ......................... B01D 35/06; B03C 1/28
[52] U.S. Cl. .................................... 210/222; 335/305; 184/6.25
[58] Field of Search ................ 335/305; 210/222, 223, 210/695; 184/6.25

[56] References Cited

U.S. PATENT DOCUMENTS

| 1,944,208 | 1/1934 | Bock | 210/222 X |
| 2,613,246 | 10/1952 | Spodig | 335/305 |
| 2,698,090 | 12/1954 | Chievitz | 335/305 |
| 2,704,156 | 3/1955 | Botstiber | 210/222 |
| 2,936,890 | 5/1960 | Botstiber | 210/222 X |
| 2,964,190 | 12/1960 | Smith | 210/222 |
| 3,151,703 | 10/1964 | Benk | 210/222 |
| 3,462,720 | 8/1969 | Miyata | 335/305 |
| 3,753,183 | 8/1973 | Aspinwall et al. | 335/305 X |
| 4,254,393 | 3/1981 | Robinson | 335/305 X |
| 4,763,092 | 8/1988 | Tomita | 210/222 |

FOREIGN PATENT DOCUMENTS

| 562887 | 9/1958 | Canada . | |
| 1079142 | 3/1953 | France | 335/305 |
| 35-32225 | 12/1960 | Japan . | |
| 61-7796 | 3/1986 | Japan . | |
| 61-7797 | 3/1986 | Japan . | |
| 861078 | 2/1961 | United Kingdom | 210/222 |

Primary Examiner—W. Gary Jones
Attorney, Agent, or Firm—Wenderoth, Lind & Ponack

[57] ABSTRACT

A magnet filter for removing magnetic metal powder mixed with oil in an oil reservoir or the like which is easily mounted to and dismounted from the oil reservoir. The magnet filter includes a recess formed on a top surface of a screw head having a screw rod studded on its bottom surface and a permanent magnet piece is fitted in the recess.

20 Claims, 3 Drawing Sheets

MAGNET FILTER

BACKGROUND OF THE INVENTION

The present invention relates to a magnet filter adapted to be mounted in a gear box or in other oil reservoirs.

In recent years, as the above-mentioned type of magnet filters, planar members in which a permanent magnet piece is wrapped up by a magnetically permeable plate made of magnetic metal have been proposed as disclosed in Japanese Utility Model Publications Nos. 61-7796 and 61-7797, and they are constructed so as to be fixedly secured to a mount portion provided on an inner wall surface of a gear box or other oil reservoirs.

However, in the case of the above-mentioned magnet filters in the prior art, the space for mounting the filter in an oil reservoir or the like becomes large, it is difficult to mount the oil filter at various locations, thus in view of design considerations, the mounting positions for the oil filters are limited, and so, it is difficult to mount the oil filter at the most effective position in view of the characteristics of the filter. Furthermore, there is a shortcoming in that dismounting of the oil filter is difficult.

SUMMARY OF THE INVENTION

It is therefore one object of the present invention to provide a novel oil filter which is free from the above-mentioned shortcomings in the prior art.

A more specific object of the present invention is to provide a novel oil filter which necessitates only a small space for mounting, and which can be mounted at various locations in an oil reservoir or the like without being restricted to a particular position and hence can be mounted at the most effective position.

Another specific object of the present invention is to provide a novel oil filter which can be easily dismounted from its mount position in an oil reservoir or the like.

According to one feature of the present invention, there is provided an improved oil filter in which a recess is formed on a top surface of a screw head having a screw rod studded on its bottom surface and a permanent magnet piece is fitted in the recess.

Since the magnet filter according to the present invention is constructed in the above-described manner, in use the screw rod portion of the magnet filter is threadedly mounted or mounted with the aid of a nut in a mounting hole formed in a peripheral wall of an oil reservoir or in another component part disposed within an oil reservoir so that the above-mentioned screw head may be positioned within the oil reservoir, and iron powder mixed with the oil within the oil reservoir is adsorbed by the permanent magnet piece fitted in the recess formed on the top surface of the screw head disposed within the oil reservoir. Then, the fixing between the screw rod and the mounting hole formed in the peripheral wall of the oil reservoir or in the other component part disposed within the oil reservoir is released, and by removing the magnet filter from the oil reservoir, the adsorbed iron powder can be removed.

As described above, according to the present invention, owing to the fact that a magnet filter is formed in a screw-plug shape, a permanent magnet piece is fitted in a recess formed on a top surface of a screw head, and a screw rod studded on a bottom surface of the same screw head is detachably mounted in a mounting hole formed in a peripheral wall of an oil reservoir or in another component part disposed within an oil reservoir, mounting and dismounting of the oil filter is simple and easy, a space necessitated for mounting the oil filter is small, the oil filter can be mounted in a stable state at various locations, and mounting of the oil filter at an effective position in view of the characteristics of the filter can be achieved easily.

Furthermore, in the case of the magnet filter according to the present invention, since a permanent magnet piece for adsorbing iron powder is fitted in a recess formed on a top surface of a screw head, an iron adsorptive area of a permanent magnet piece can be designed to be large, and the performance of an oil filter can be improved.

The above-mentioned and other objects, features and advantages of the present invention will become more apparent by reference to the following description of preferred embodiments of the invention taken in conjunction with the accompanying drawings.

DESCRIPTION OF THE PREFERRED EMBODIMENTS

Figure 1:
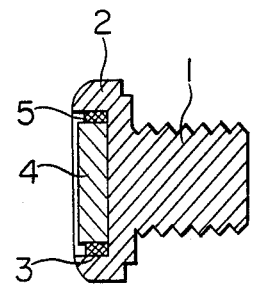
FIG. 1 is a longitudinal cross-section side view showing one preferred embodiment of the magnet filter according to the present invention.
Figure 2:
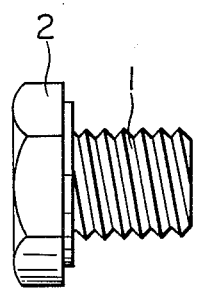
FIG. 2 is a side view of the same.

Referring now to FIGS. 1 and 2 which show one preferred embodiment of the present invention, a cylindrical recess (3) is formed on a top surface of a screw head (2) of hexagonal cross-sectional cylinder shape having a screw rod (1) studded on or extended from its bottom surface, and a permanent magnet piece (4) of cylindrical plate-like shape is fitted in the recess (3). In FIG. 1, reference numeral (5) designates a non-magnetic metal ring made of aluminum or the like and fitted in an annular space between the permanent magnet piece (4) and a peripheral wall of the cylindrical recess (3).

Since the illustrated embodiment is constructed as described above, the above-mentioned screw rod (1) is threadedly fitted in a screw hole (6) penetrated through a peripheral wall of an oil reservoir (A) from the inside of the oil reservoir (A) with the top surface of the screw head placed inside of the oil reservoir (A), and iron powder mixed in the oil within the oil reservoir (A) is adsorbed by the permanent magnet piece (4) fitted in the recess (3) of the screw head (2).

Subsequently, the above-described magnet filter is dismounted from the screw hole (6) of the oil reservoir (A) by unscrewing the screw rod (1) in the opposite direction to the previous screwing, and then the adsorbed iron powder is removed.

Figure 4:
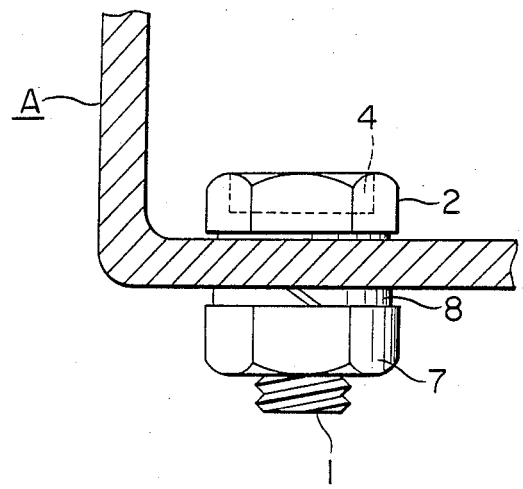
Figure 5:
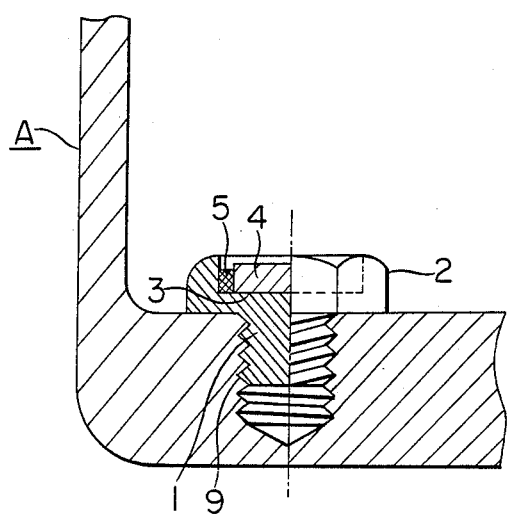
Figure 6:
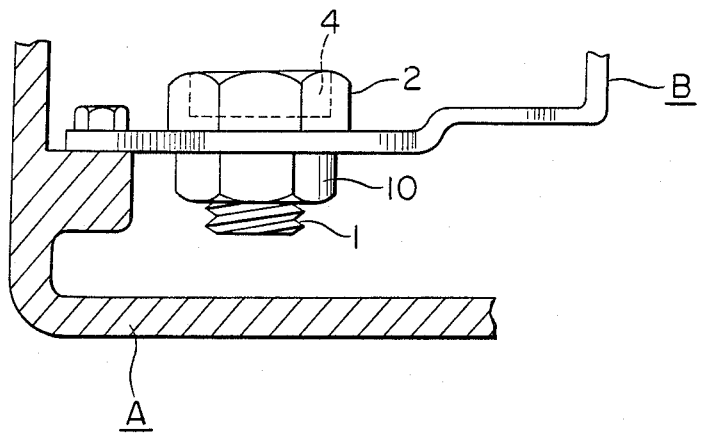

FIGS. 4 to 6, respectively, illustrate examples of use of the above-described magnet filter. In the example shown in FIG. 4, the screw rod (1) of the magnetic filter is penetrated through a through-hole formed in an oil reservoir (A), and a nut (7) is threadedly engaged with the portion of the screw rod (1) projecting from the through-hole and then tightened. In this figure, reference numeral (8) designates a washer.

In the example shown in FIG. 5, a blind screw hole (9) is formed in a peripheral wall of an oil reservoir (A), and the screw rod (1) of the magnet filter is threadedly fitted in the same screw hole (9).

In the example shown in FIG. 6, the screw rod (1) of the above-described magnet filter is penetrated through a through-hole formed in another component part (8) mounted within an oil reservoir (A), and a nut (10) is threadedly engaged with the portion of the screw rod (1) projecting from the same through-hole.

Figure 3:
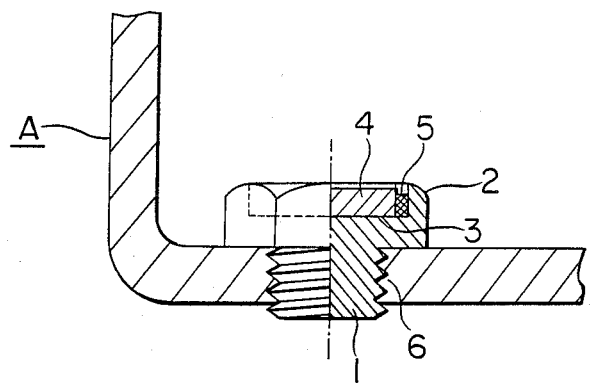
FIGS. 3 to 6, respectively, are longitudinal cross-section views showing different states of use of the same magnet filter.

It is to be noted that the magnet filter could be mounted to the above-described other component part (B) through the method illustrated in FIGS. 3 to 5.

As described above, according to the illustrated embodiment, by forming a magnet filter of screw-plug shape in which a permanent magnet piece (4) is fitted in a recess (3) formed on a top surface of a screw head (2) having a screw rod (1) studded on its bottom surface, the magnet filter can be easily mounted to and dismounted from an oil reservoir (A) or another component part mounted to an oil reservoir (A). Furthermore, a space necessitated for mounting and dismounting of the magnet filter can be made small, and the magnet filter can be mounted at a desired location.

In addition, since the permanent magnet piece (4) for adsorbing iron powder is fitted in the recess (3) formed on the top surface of the screw head (2), it is possible to increase an iron powder adsorptive area of the permanent magnet piece (4) and thereby improve the performance of a magnet filter.

Figure 7:
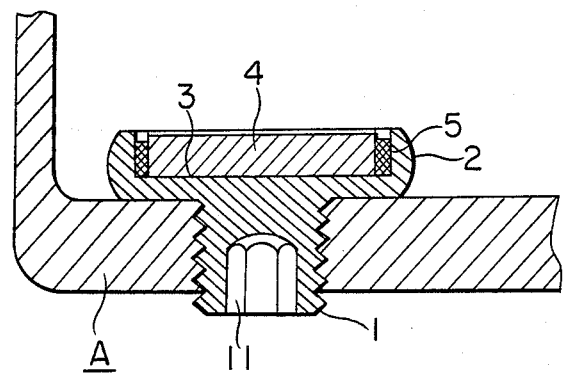
FIG. 7 is a longitudinal cross-section view showing a state of use of another preferred embodiment of the magnet filter according to the present invention.

FIG. 7 shows another preferred embodiment of the present invention, in which a hexagonal cross-sectional bore (11) is drilled in a tip end portion of a screw rod (1), hence after the screw rod (1) has been screwed into a screw hole (6) formed in the wall of the oil reservoir (A), a hexagonal rod spanner is engaged with the hexagonal cross-sectional bore (11) drilled in the screw rod (1), and thereby the screw rod (1) can be fastened to the wall of the oil reservoir (A) externally thereof. Likewise, the oil filter can be dismounted externally of the oil reservoir (A). It is to be noted that in FIG. 7, component parts equivalent to those of the preceding embodiments are given like reference numerals.

Figure 8:
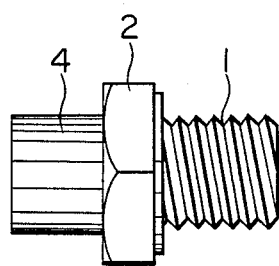
FIG. 8 is a side view showing still another preferred embodiment of the magnet filter according to the present invention.
Figure 9:
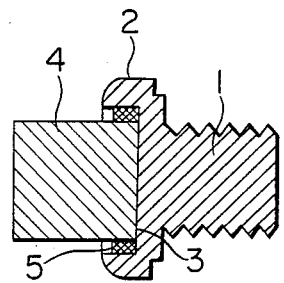
FIG. 9 is a longitudinal cross-section side view of the same magnet filter.

FIGS. 8 and 9 illustrate still another preferred embodiment of the present invention in which a relatively thick permanent magnet piece (4) is fitted in a recess (3) of a screw head (2) so that a part of the permanent magnet piece (4) may project outside of the screw head (2), and thereby an iron powder adsorptive area of the permanent magnet piece (4) is increased. It is to be noted that in FIGS. 8 and 9 also, component parts equivalent to those of the preceding embodiments are given like reference numerals.

While a principle of the present invention has been described above in connection with preferred embodiments of the invention, it is a matter of course that many apparently widely different embodiments of the present invention could be made without departing from the spirit of the present invention.

What is claimed is:

1. A magnet filter in combination with an oil reservoir, comprising:
    a magnet filter comprising a screw plug having a screw head engageable with a tool for rotating the screw head and a screw rod, the screw rod having a diameter less than that of the screw head and extending from a bottom surface of the screw head and a top surface of the screw head having a recess therein; and means for contacting oil containing iron powder and for retaining iron powder thereon comprising a permanent magnet piece fitted in the recess of the screw head; and
    a wall of an oil reservoir, the wall having a threaded hole therein and the screw rod being threadedly engaged with the threaded hole such that the screw head is located within the oil reservoir and the magnet filter is removably mounted in the oil reservoir.

2. The combination of claim 1, wherein the threaded hole extends into but not through the wall of the reservoir.

3. The combination of claim 1, wherein the threaded hole extends completely through the wall of the reservoir.

4. The combination of claim 1, wherein the screw head has a hexagonal outer periphery, the recess is a cylindrical recess extending into the top surface of the screw head, and the permanent magnet piece has a cylindrical shape and is fitted in the recess.

5. The combination of claim 4, wherein the permanent magnet piece of cylindrical shape is fitted in the cylindrical recess with an annular space therebetween, and a non-magnetic metal ring is tightly fitted in the annular space.

6. The combination of claim 1, wherein the permanent magnet piece extends outwardly from the recess beyond the top surface of the screw head.

7. A magnet filter in combination with an oil reservoir, comprising:
    a magnet filter comprising a screw plug having a screw head engageable with a tool for rotating the screw head and a screw rod, the screw rod having a diameter less than that of the screw head and extending from a bottom surface of the screw head and a top surface of the screw head having a recess therein; and means for contacting oil containing iron powder and for retaining iron powder thereon comprising a permanent magnet piece fitted in the recess of the screw head;
    a wall of an oil reservoir; and
    a bracket within the reservoir and attached to the wall, the bracket having a hole therein and the screw rod extending therethrough such that the screw head is located within the oil reservoir and the magnet filter is removably mounted in the oil reservoir.

8. The combination of claim 7, wherein the screw head has a hexagonal outer periphery, the recess is a cylindrical recess extending into the top surface of the screw head, and the permanent magnet piece has a cylindrical shape and is fitted in the recess.

9. The combination of claim 8, wherein the permanent magnet piece of cylindrical shape is fitted in the cylindrical recess with an annular space therebetween, and a non-magnetic metal ring is tightly fitted in the annular space.

10. The combination of claim 9, wherein the permanent magnet piece extends outwardly from the recess beyond the top surface of the screw head.

11. The combination of claim 7, wherein the permanent magnet piece extends outwardly from the recess beyond the top surface of the screw head.

12. A magnet filter in combination with an oil reservoir, comprising:

a magnet filter comprising a screw plug having a screw head and a screw rod, the screw rod having a diameter less than that of the screw head and extending from a bottom surface of the screw head and a top surface of the screw head having a recess therein, the screw rod having a bore in a free end thereof so as to be engageable with a rod spanner; and means for contacting oil containing iron powder and for retaining iron powder thereon comprising a permanent magnet piece fitted in the recess of the screw head; and a wall of an oil reservoir, said wall having a threaded hole therethrough and the screw rod being threadedly engaged with the threaded hole such that the screw head is located within the oil reservoir and the magnet filter is removably mounted in the oil reservoir.

13. The combination of claim 12, wherein the permanent magnet piece extends outwardly from the recess beyond the top surface of the screw head.

14. The combination of claim 12, wherein the cross-sectional shape of the screw head is round.

15. The combination of claim 12, wherein the cross-section of the bore in the free end of the screw rod is hexagonal.

16. A magnet filter in combination with an oil reservoir, comprising:

a magnet filter comprising a screw plug having a screw head engageable with a tool for rotating the screw head and a screw rod, the screw rod having a diameter less than that of the screw head and extending from a bottom surface of the screw head and a top surface of the screw head having a recess therein; and means for contacting oil containing iron powder and for retaining iron powder thereon comprising a permanent magnet piece fitted in the recess of the screw head; and a wall of an oil reservoir, the wall having a hole therethrough, the screw rod extending through the wall and means for removably securing the magnet filter to the wall such that the screw head is located within the oil reservoir and the magnet filter is removably mounted in the oil reservoir.

17. The combination of claim 16, wherein the screw head has a hexagonal outer periphery, the recess is a cylindrical recess extending into the top surface of the screw head, and the permanent magnet piece has a cylindrical shape and is fitted in the recess.

18. The combination of claim 17, wherein the permanent magnet piece of cylindrical shape is fitted in the cylindrical recess with an annular space therebetween, and a non-magnetic metal ring is tightly fitted in the annular space.

19. The combination of claim 16, wherein the permanent magnet piece extends outwardly from the recess beyond the top surface of the screw head.

20. The combination of claim 16, wherein the means for removably securing the magnet filter to the wall comprises a threaded nut in threaded engagement with the threaded rod with the wall between the nut and the screw head.

* * * * *